United States Patent [19]

Ames et al.

[11] Patent Number: 4,551,025
[45] Date of Patent: Nov. 5, 1985

[54] APPARATUS FOR MANUFACTURING SOFT ICE CREAM AND THE LIKE

[75] Inventors: Theodore Ames; Vernon E. Brown, Jr., both of Portland, Oreg.

[73] Assignee: Glacier Products, Portland, Oreg.

[21] Appl. No.: 637,382

[22] Filed: Aug. 2, 1984

[51] Int. Cl.⁴ ............................................. A23G 9/00
[52] U.S. Cl. .................................... 366/144; 62/135; 62/342; 366/145; 366/601
[58] Field of Search ............... 366/144, 142, 145, 149, 366/601; 62/342, 343, 132, 135, 137; 374/170; 99/452, 453, 455

[56] References Cited

U.S. PATENT DOCUMENTS

| | | | |
|---|---|---|---|
| 3,898,858 | 8/1975 | Erickson | 62/342 X |
| 4,241,590 | 12/1980 | Martineam | 366/320 X |
| 4,463,572 | 8/1984 | Brown, Jr. | 366/144 X |

Primary Examiner—Timothy F. Simone
Attorney, Agent, or Firm—Jack E. Day

[57] ABSTRACT

A soft ice cream machine which has a controller in contact with a freezing chamber. The controller is provided with temperature information from a temperature sensor, which senses when the temperature of the ice cream is approaching a temperature which could bring about freeze-up and disables the compressor until the mixture warms up a selectable amount. The controller automatically switches the refrigeration compressor and the mixer and auger to a standby condition when the controller senses that the dispensing spigot has not been actuated. The controller further senses when the temperature of the ice cream in the freezing chamber is approaching a temperature which would give an inadequately frozen product unacceptable to consumers.

17 Claims, 6 Drawing Figures

APPARATUS FOR MANUFACTURING SOFT ICE CREAM AND THE LIKE

BACKGROUND OF THE INVENTION

The present invention relates to improvements in apparatus for manufacturing semi-frozen custard-like desserts, in general, and specifically to improvements in apparatus for manufacturing soft ice cream and the like from prepared liquid mixes.

The improvements described and claimed herein were made to a machine similar to that described in co-pending U.S. Pat. No. 4,463,572 for SOFT ICE CREAM MACHINE of VERNON E. BROWN, JR., one of the co-inventors hereof, and the prior art discussed therein is applicable hereto. However, the improvements described and claimed herein will be applicable to almost any machine for manufacturing soft ice cream, providing suitable modifications were made to adapt the present invention to the specific structures of such machines. Those skilled in the art will recognize that the benefits of the present invention would attach to any machine incorporating it, would detracting from its novelty and usefulness.

Among the problems encountered with existing soft ice cream machines is a tendency for them to "freeze up" when numerous small portions are being served. Many machines turn on the refrigeration compressor and beater when portions of product are served to compensate for the rise in temperature that takes place as new, warmer premix is released from a reservoir into the freezing chamber. Those skilled in the art know that the product nearest to the dispensing spigot will be substantially cooler than that closest to the inlet from the reservoir into the freezing chamber and, if numerous small servings are dispensed, the freezing process will be continuous and the product in the freezing chamber will have a tendency to freeze into a solid mass. When this happens, either the machine must be shut off until this frozen material has softened, or some provision must be made to heat this portion to prevent it from solidifying. If the machine is set to avoid this problem, during periods of infrequent servings the machine will serve ice cream which is insufficiently frozen.

Another problem encountered with existing machines relates to those extended periods when no product is served.

Some makers of these machines have incorporated a switch which will place the machine into a standby condition which reduces the amount of mixer agitation during such periods. However, it is easy to forget to operate the switch, either to place it into standby condition, or to place in back into normal condition.

A further problem relates to conditions encountered when serving numerous large portions. Under these conditions, the freezing mechanism may not be able to keep pace with the serving demands and the product begins to exhibit characteristics of inadequate freezing. If the freezing capabilities are set to handle this problems, the machine will freeze up during extended periods of non-use or, conversely, of producing many small servings, as hereinbefore described.

These and other problems are solved by the novel improvments herein described and claimed, as will be recognized by those skilled in the art.

SUMMARY OF THE PRESENT INVENTION

The present invention comprises improvements found to be useful as applied to soft ice cream manufacturing machines of the type described in U.S. Pat. Nos. 3,898,858 to Erickson, 4,383,417 to Martineau, and in U.S. Pat. No. 4,436,527 to Brown, one of the co-inventors of the present invention, and co-pending with this application.

The mechanical structure of the present invention, for purposes of illustration and discussion (and insofar as it is applicable), can be considered similar to the mechanical structure of Brown.

A primary objective of the present invention is to prevent "freeze-up" of the freezing chamber of a soft ice cream machine, by providing a controller which is provided with temperature information from a temperature sensor, and which senses when the temperature of the ice cream is approaching a temperature which could bring about freeze-up and disables the compressor until the mixture warms up a selectable amount.

A further objective is to provide a controller for a soft ice cream manufacturing machine which automatically switches the refrigeration compressor and the mixer and auger to a standby condition when the controller senses that the dispensing spigot has not been actuated for some time. This keeps the mix within a desirable range of temperatures, and saves energy.

A still further objective is to provide a controller for a soft ice cream machine which senses when the temperature of the ice cream in the freezing chamber is approaching a temperature which would give an inadequately frozen product unacceptable to consumers. When such a condition occurs, the controller not only actuates the compressor and mixer-auger, but disables on optional portion control means until the temperature of the mix has been cooled to an acceptable level, reducing waste of both energy and product.

Still further objectives, features and advantages of the present invention will be more readily understood upon consideration of the following detailed description of the invention taken in conjunction with the accompanying drawings.

DETAILED DESCRIPTION OF THE PRESENT INVENTION

Figure 1:
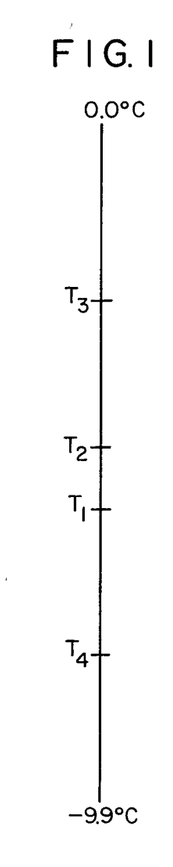
FIG. 1 is a graphical representation of several important temperatures useful in understanding the improved operation obtained by use of the present invention.

Turning now to FIG. 1, we see a graphical representation of several temperatures which are important to an understanding of the advantages of the present invention.

Temperature T1 is the temperature at which it is desired to serve the soft ice cream product. Temperature T2 is the temperature at which it is desired the refrigeration compressor (hereinafter "compressor") and the mixer-auger (hereinafter "mixer-auger", "mixer" or "auger", according to the context) be actuated to obtain a desirable product acceptable to most customers. Temperature T3 is the warmest temperature at which it is desired the product should be served. Temperature T4 is the temperature below which it is desired the product should not go, to avoid "freeze-up" of the mixer-auger in the freezing chamber.

Temperature T1 is adjustable and is set according to local preferences as to coldness and/or consistency, or according to the product being manufactured.

Temperature T2 is set by the factory to be a constant difference warmer than temperature T1.

Temperature T3 is set by the operator, accordingly to local preference or the product being produced.

Temperature T4 is set by the factory or the operator to avoid freeze-up, and can be adjusted, if necessary.

Temperature T1 is set accordingly to local taste and/or product requirements, for example, at 6.8° C. or 19.76° F. Temperature T2 would then be, by factory pre-setting, −6.6° C. (20.12° F.), and the controller means 10, hereinafter described in greater detail, would actuate the compressor and mixer when the soft ice cream in the freezer warmed up to this temperature.

The operator may know, from personal knowledge of the preference of his customers that, for a given product mix, the temperature and consistency obtained at, for example, 6.0° C. (21.2° F.) is the warmest acceptable. Therefore, he would set the temperature T3 at that temperature, by whatever convenient means may be provided for that purpose as, for example, the use of switches or by entering that temperature into the memory of the controller means.

Temperature T4 would normally be set by the factory at a setting, for example, of 0.8° C. (1.44° F.) colder than temperature T1, which would be −7.6° C. 18.32° F., representing the coldest temperature that most frozen mixtures can assume without congealing into a solid, unmanageable mass. However, in the preferred embodiment even this can be adjusted to an even colder temperature when dealing with unusual mixtures or conditions, for example, 1.5° C. (2.7° F.) colder than T1, or 8.3° C. (17.06° F.).

The aforementioned temperatures and temperature differentials are illustrative, and are not means to be limiting or definitive, as those skilled in the art will recognize. Local conditions, local preferences, and different products may require different values than those mentioned.

Figure 2:
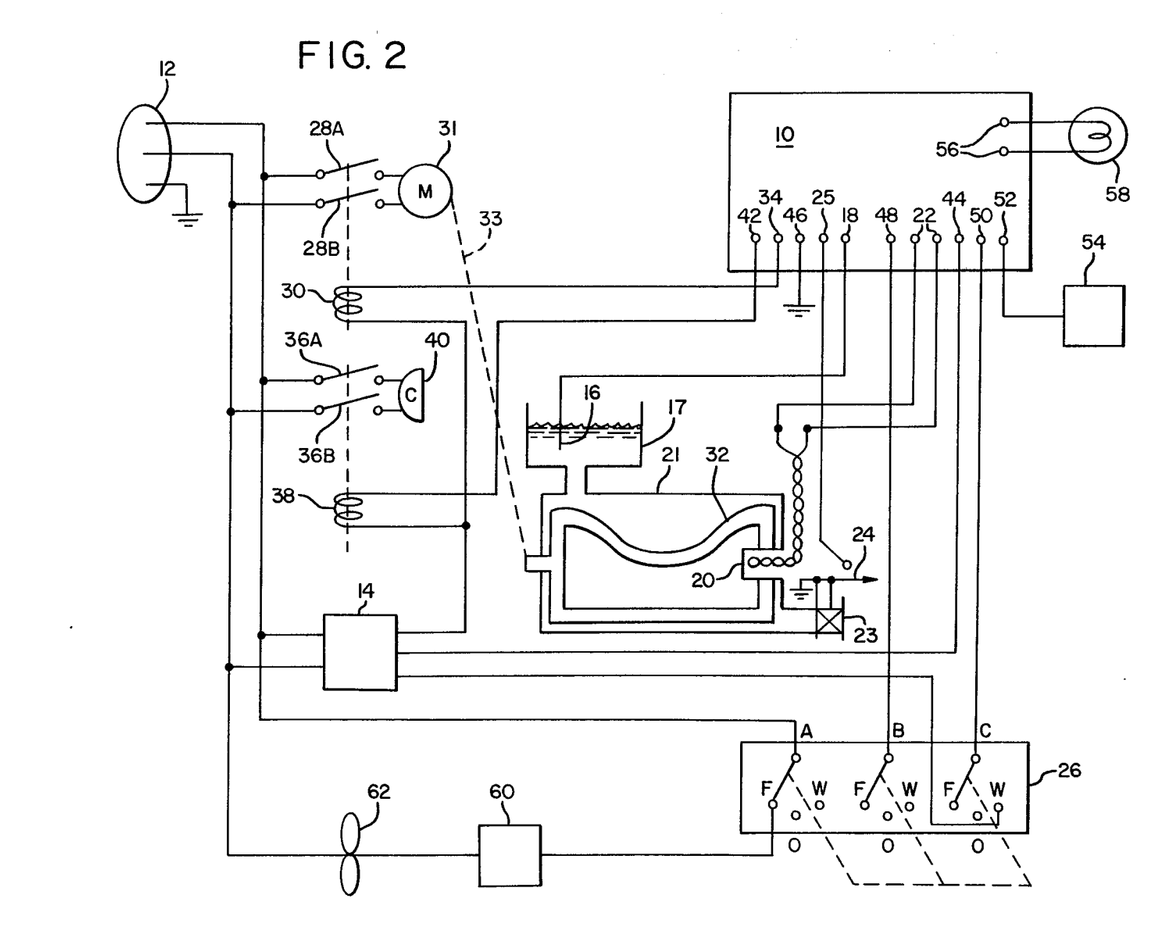
FIG. 2 is a highly schematic structural and wiring diagram of the present invention.

FIG. 2 illustrates, in a highly schematic manner, the wiring diagram and the essential mechanical structure of the present invention. Controller 10 is the heart of the present invention, receiving energy from any convenient source, such as AC mains voltage, at input 12. Transformer (and power supply) 14 provided appropriate voltage levels to operate the circuits and other devices of the invention. The level sensor 16 is located in the pre-mix reservoir 17, and is connected to controller means 10 at terminal 18. Temperature sensor 20 is connected to a controller means 10 at terminal 22 and may be located as disclosed and claimed in U.S. Pat. No. 4,467,572 co-pending with this application hereinbefore. However, temperature sensor 20 may be located at any location where a reliable and accurate reading can be obtained of the temperature of the frozen product.

Serving switch 24 is located where it can be actuated by operation of the dispensor spigot 23, and is connected to controller means 10 at terminal 25.

Master switch 26A-C has three positions: "O" (off), "F" (freeze), and "W" (wash), and is at "O" (off) position when the unit is not operating.

Switch 28A-B is operated by relay 30 at a signal from controller means 10 and provides energy to operate motor 31 drivingly connected, as indicated by dashed line 33, to mixer-auger 32. It is connected to controller means 10 at terminal 34.

Switch 36A-B is operated by relay 38 at a signal from controller means 10 and provides energy to operate compressor 40. It is connected to controller means 10 at terminal 42.

The secondary winding of transformer and power supply 14 is connected at one terminal to relays 30 and 38: at another terminal to the switched poles of switch 26C; and at the third terminal to terminal 44 of controller means 10. The D.C. output connections of transformer and power supply 14 are not shown as they are not necessary to an understanding of this invention.

Terminal 46 of controller means 10 is connected to system ground; terminal 48 is connected to the common pole of switch 26B; terminal 50 of controller means 10 is connected to the common pole of switch 26C; terminal 52 of controller means 10 is connected to portion control means 54; and output terminals 56 of controller means 10 are connected to indicator light 58, which signals when the reservoir 17 needs to be replenished.

Portion control means 54, although not a part of the present invention and therefore not shown in detail in FIG. 2, should be described to further reveal the range of functions controlled by controller means 10. Portion control means 54 includes a timer which gives a selection of several times during which the frozen product will be served, determining whether small, medium or large portions will be served, depending upon customer preference. Each setting is adjustable, and permits rather precise control of the amount of product which will be served. In addition, an over-ride switch can be included in the preferred embodiment which permits the operator to shut off the operation no matter what time limits have been set. Further, and to the point of the present invention, the operation of portion control means 54 can be disabled by a signal from terminal 52 of controller means 10, as will be more fully described hereinafter.

The operation of controller means 10, connected as described hereinbefore, can best be understood by reference to FIGS. 3-5A and 5B, in conjunction with FIGS. 1 and 2.

Figure 3:
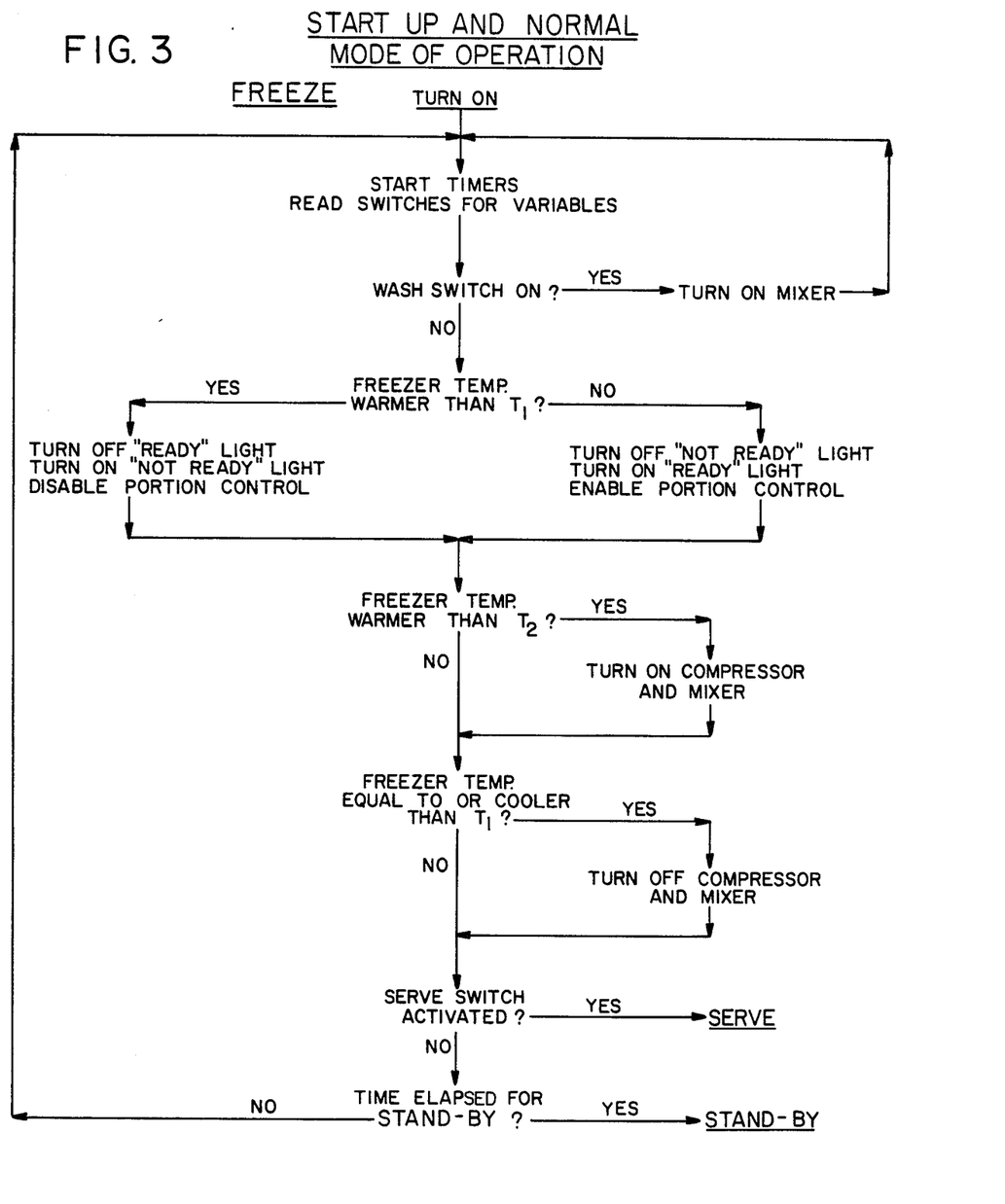
FIG. 3 is a flow chart of the operation of the controller means of the present invention during the START-UP and NORMAL operation mode of operation.

START-UP and NORMAL mode of operation can best be understood by reference to FIGS. 1, 2 and 3, the temperature chart, schematic, and flow chart for START-UP and NORMAL operation, respectively. When electrical energy is applied to input 12, voltages of appropriate level are applied to controller means 10, various timers (not shown) are started, and various switch settings (not all of which are shown as they are not necessary to an understanding of the invention) are read by controller means 10 to determine operation, as will hereinafer become clear. The FREEZE-OFF-WASH switch 26A-C is checked to see whether it is in FREEZE or WASH position. If in WASH position, mixer motor 32 is actuated, and the other procedures necessary to cleanse the machine are followed. If switch 26A-C is in FREEZE position, controller means 10 checks temperature sensor 20 to see whether the temperature in the freezing chamber 21 is warmer than T3. If so, controller means 10 turns off a "READY" light and turns on a "NOT READY" light (both not shown, as they are not pertinent to an understanding of the invention, other than to illustrate the range of functions controller means 10 performs), and disables portion control means 54. If temperature sensor 20 indicates a temperature cooler than T3, the "READY" light is turned on, the "NOT READY" light is turned off, and portion control means 54 is enabled. Controller means 10 then proceeds to check whether temperature sensor 20 indicates a temperature warmer than T2 in the mixing chamber 21. If so, refrigeration compressor 40 and mixer 32 are actuated to bring down the temperature to the desired temperature T1. If, however, sensor 20 indicates a temperature cooler than T2, this step is bypassed. When sensor 20 indicates a temperature equal to or cooler than T1, controller means 10 turns off, compressor 40 and mixer 32.

When serving switch 24 is actuated by operation of the dispensor spigot 23, whether manually or under the control of portion control means 54, controller means 10 goes into SERVE mode of operation, hereinafter described more completely. When controller means 10 determines that a certain time, for example, 20 minutes, has elapsed since serving switch 24 has been activated, controller means 10 goes into STANDBY mode of operation, hereinafter described more completely. If such a certain time has not elapsed since the activation of serving switch 24, controller means 10 reverts to the beginning, or the block labeled FREEZE, of the operational sequence just described in connection with the flow chart depicted in FIG. 3, and continues to recycle as therein described until diverted by one of the events therein identified.

Figure 4:
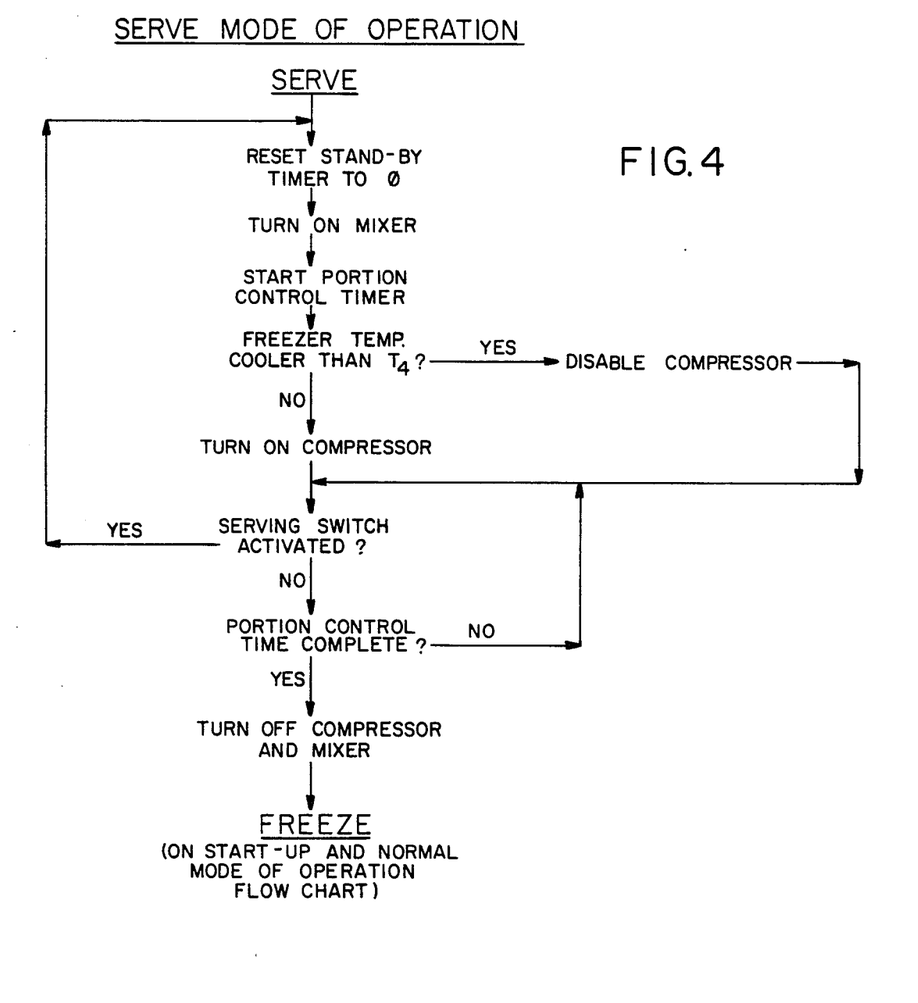
FIG. 4 is a flow chart of the operation of the controller means of the present invention during the SERVE mode of operation.

As described hereinbefore, when serving switch 24 is activated, controller means 10 shifts into the SERVE mode of operation, which can best be understood by referring to FIG. 4, taken in conjunction with the temperature chart of FIG. 1 and the schematic of FIG. 2.

As serving switch 24 is activated, either manually or under control of portion control means 54, an automatic elapsed-time clock (not shown) contained within controller means 10 is reset to 0 time, to be reactivated when switch 24 is deactivated. This initiates another elapsed-time measurement, mentioned herinbefore, which determines whether controller means 10 will go into the STANDBY mode of operation as hereinafter described. Following resetting of the elapsed-time clock, mixer-auger 32 and compressor 40 are activated, to prevent warmer product mix, entering the freezer chamber 21 to replace the frozen product being withdrawn to serve to a customer, from warming up the product still contained in the freezing chamber to an unacceptable temperature T3. At the same time, if the portion control means 54 was activated, the serving timer (not shown) within means 54, will operate until the desired amount of frozen product has been dispensed. The auger 32 pumps the frozen product out through the dispenser spigot into a container. During this time, temperature sensor 20 is constantly indicating the temperature of the product mix so that it does not become colder than temperature T4, in which a case compressor 40 is disabled, to prevent a freeze-up.

Although a freeze-up is not likely to occur during serving, it could happen. During periods when many small portions of product are being served, the compressor 40 may be operating continuously, and the temperature can very easily go so low that the mix in the freezing chamber 21 can freeze into a solid mass. To prevent this from happening, if temperature sensor 20 indicates a product temperature cooler than T4, controller means 10 disables compressor 40 until sensor 20 indicates a temperature warmer than T4 in the freezing chamber 21, when compressor 40 is enabled so that it can be actuated if required.

The dispensor spigot 23 continues open until the operator closes it or the timer within portion control means 54 indicates that the desired portion has been served, at which time the dispensor spigot 21 is closed, the elapsed-time indicator of controller means 10 is started, mixer-auger 32 is turned off, and compressor 40 is turned off. Controller means 10 reverts to the normal cycle as depicted in the flow chart in FIG. 3 at the point labeled FREEZE.

Figure 5A:
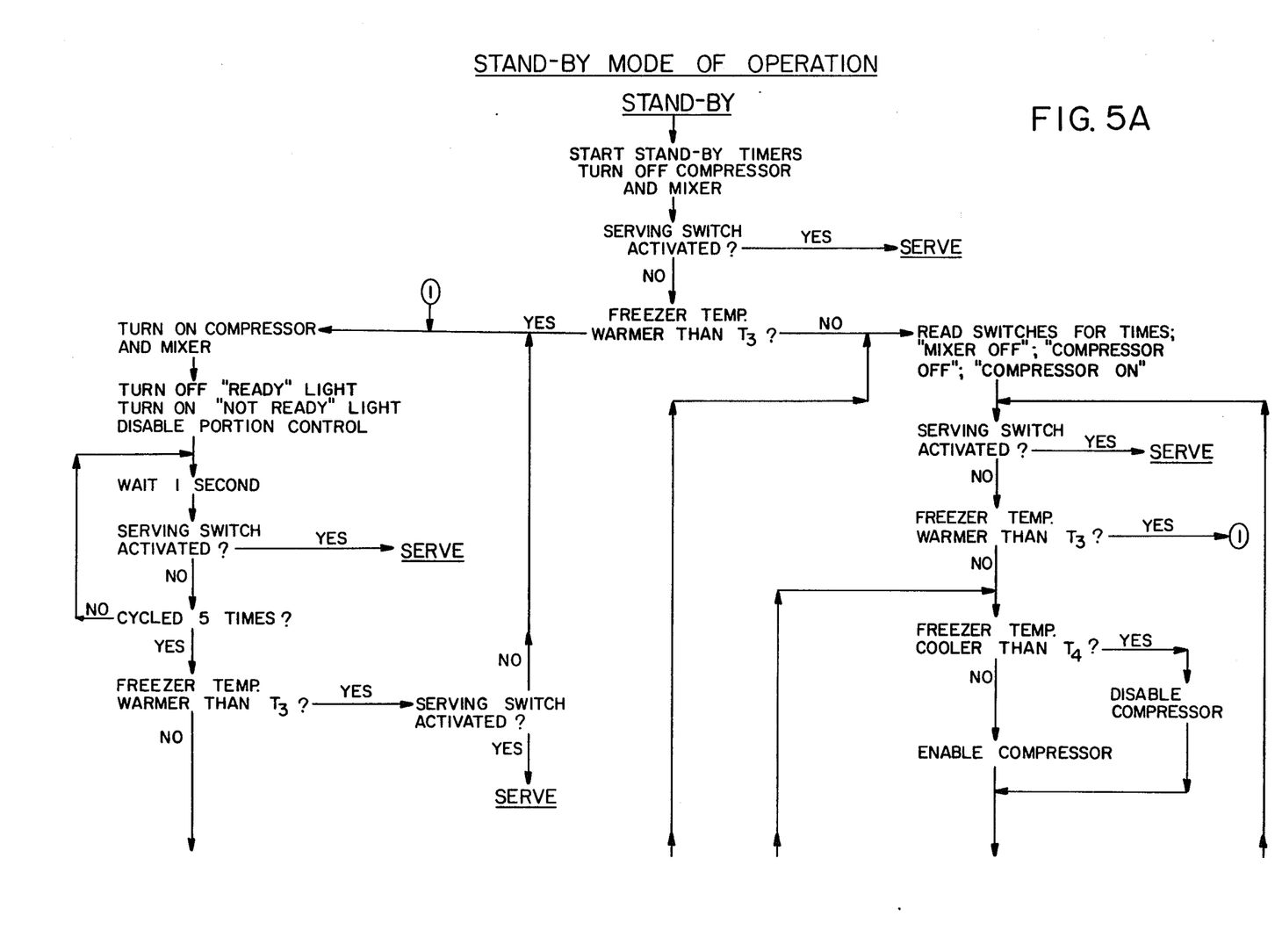
FIGS. 5a and 5b is a flow chart of the operation of the controller means of the present invention during the STANDBY mode of operation.
Figure 5B:
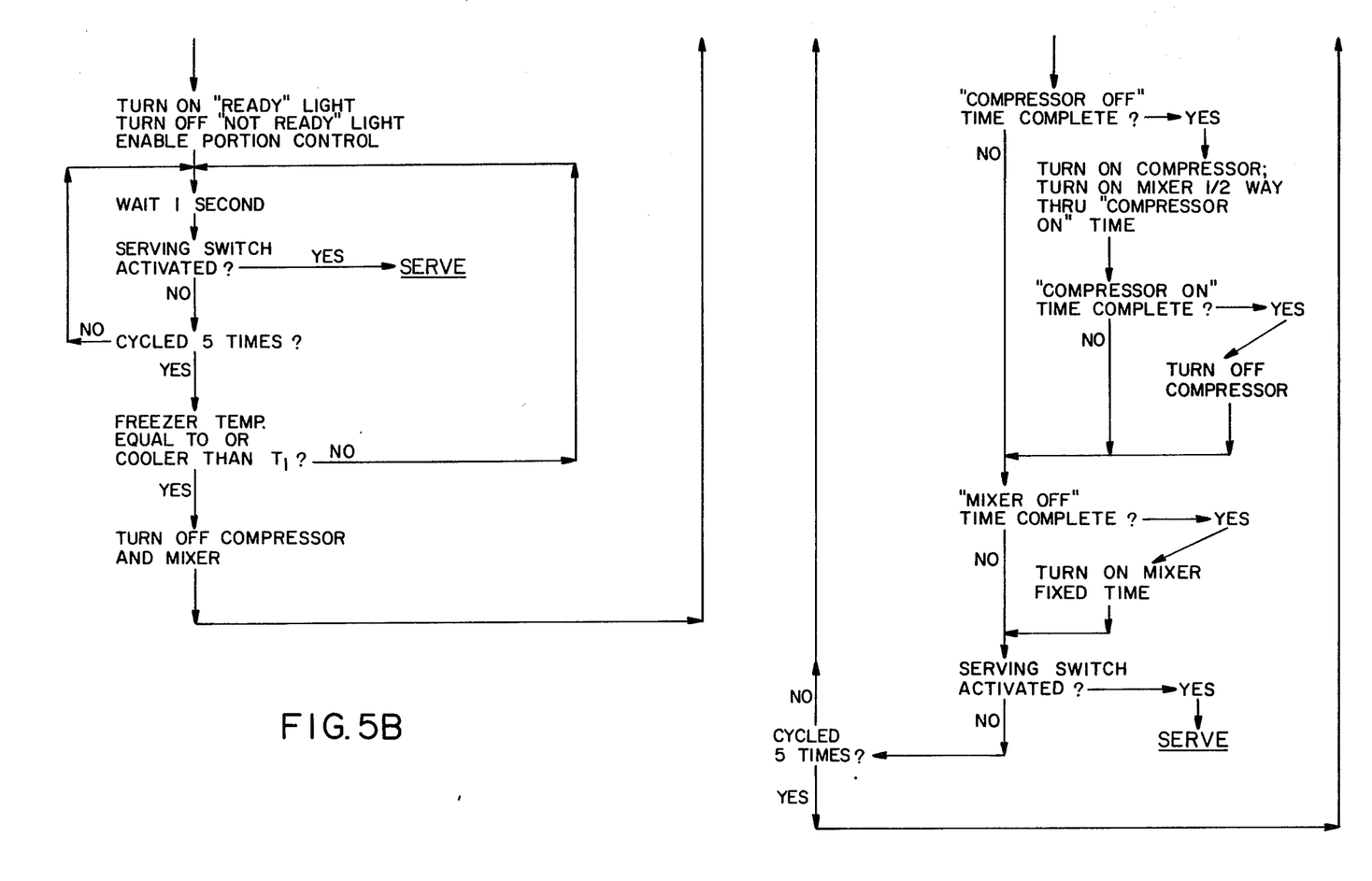

If the elapsed-time indicator within controller means 10 indicates that a pre-set period has elasped, for example 20 minutes, since serving switch 24 has been acitvated, controller means 10 goes into STANDBY mode of operation in accordance with the flow chart depicted in FIGS. 5A and 5B. At this time, standby timers (not shown) within controller means 10 are activated, and compressor 40 and mixer 32 are turned off, if they have been operating. If serving switch 24 is activated by use of the dispensor spigot 23 or portion control means 54 at any time during STANDBY mode, controller means 10 reverts to SERVE mode of operation. If, however, serving switch 24 is not activated, controller means 10 checks the temperature of the product mix indicated by sensor 20. Depending upon the temperature indicated, contoller means 10 goes into either a first cycle of operation, or a second cycle of operation, as herinafter described and referred to.

If temperature sensor 20 indicates a product mix temperature cooler than temperature T3, controller means 10 goes into the said first cycle of operation. Controller means 10 sets into operation three separate timers (not shown) located within controller means 10: a "mixer off" timer; a "compressor off" timer; and a "compressor on" timer. These can be set by the operator by means of manually operated switches (not shown) according to past experience with the ambient temperature, the product mix, customer preference, and similar factors.

At this point in STANDBY mode of operation begins a first loop of operation, to be described and referred to hereinafter. Controller means 10 then checks to see whether serving switch 20 has been activated: if so, controller means 10 goes into SERVE mode; if not, controller means 10 then checks to see if the temperature of the product mix, as indicated by sensor 20, is warmer than T3: if so, controller means 10 goes into said second cycle of operation, as mentioned hereinbefore and hereinafter described.

The next step of said first cycle of operation commences a second loop of operation, as hereinafter described and referred to. If sensor 20 indicated that the product mix is cooler than T4, controller means 10 disables compressor 40 until the sensor 20 indicates that the temperature of the product mix is warmer than T4, at which time controller means 10 enables compressor 40. "Enabling" compressor 40 does not mean actuating it, but merely making it possible to be actuated should conditions indicate, as hereinafter described. Controller means 10 then checks to see whether the "compressor off" timer has completed its preset period: if so, compressor 40 is actuated for the 'compressor on' time and mixer 32 is actuated for a pre-set, shorter period about one-half way through the "compressor on" period; if not, controller means 10 checks to see whether the "mixer off" timer has completed its preset period: if so, mixer 32 is actuated for preset time; if the "mixer off" period has not been completed, controller 10 checks to see whether serving switch 20 has been activated: if so, controller means 10 goes into SERVE mode of operation.

If serving switch 20 has not been activated, controller means 10 checks to see whether said second loop of operation has been performed five times: if not, it is performed again; if so, controller means 10 repeats said first loop of operation, as hereinbefore mentioned. This first loop of operation is repeated until controller means 10 detects that serving switch 20 has been activated, which reverts controller means 10 to SERVE mode of operation.

If controller means 10 detects that temperature sensor 20 indicates a temperature warmer than temperature T3, controller means 10 goes into a second cycle of operation as mentioned hereinbefore and now described.

When sensor 20 indicates a temperature warmer than T3, controller means 10 actuates compressor 40 and mixer 32. The "READY" light is extinguished and the "NOT READY" light is turned on. Portion control means 54, if used, is disabled. After a one second wait, controller means 10 checks to see if serving switch 24 is activated; if so, controller means 10 goes into SERVE mode of operation; if not, controller 10 checks to see whether the serving switch has been checked five times; if not, controller means 10 waits another second and rechecks. If the state of serving switch 24 has been checked five times, controller means 10 checks sensor 20 to see if the temperature of the product mix is warmer than T3: if so, controller means 10 checks to see whether serving switch 24 has been activated manually, the portion control having been disabled as hereinbefore described: if so, controller 10 goes into SERVE mode of operation. If serving switch 24 has not been activated manually, controller means 10 reverts to the beginning of the second cycle of operation, as hereinbefore described.

When controller means 10 checks to see if sensor 20 indicates a product mix temperature is warmer than T3, if it does *not* find such a temperature, that is, if it finds a temperature equal to or *cooler* than T3, controller means 10 extinguishes the "NOT READY" light; turns on the "READY" light; and enables portion control means 54.

Following these operations, controller means 10 then goes into another five second period of checking the operation of serving switch 24 each second, as hereinbefore described. If, after five times of checking the serving switch 24 has *not* been activated, controller means 10 checks sensor 20 to see whether the temperature of the product mix is equal to or colder than temperature T1: if so, compressor 40 and mixer 32 are turned off, and controller means 10 goes into the first cycle of operation as hereinbefore described. If sensor 10 indicates the temperature is *not* equal to or cooler than T1, controller means 10 goes backthrough the five second cycle of checking to see whether serving switch 24 has been activated. This recycling is repeated until the temperature is indicated to be equal to or colder than T1, when controller means 10 goes into the first cycle of operation as described hereinbefore.

Whenever the level of unfrozen product mix in the reservoir 17 falls below a preset level, as indicated by the voltage supplied to controller means 10 at terminal 18 by detector 16, controller means 10 actuates indicator light 58, indicating the need to replenish the reservoir 17.

Whenever the temperature within the cabinet housing the freezer unit rises above a certain preset limit, thermostat 60 closes, actuating fan motor 62 to hold the internal temperature within desired limits.

Undoubtedly, those skilled in the art will be able to perceive many changes in sequence and operation which could be made to the above program without changing significantly the desired outcome of the invention or departing from its spirit or intent, as hereinbefore described.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What we claim as our invention is:

1. In an apparatus for manufacturing soft ice cream and the like from prepared liquid mixes, said apparatus having a reservoir, temperature sensor freezing chamber, compressor, mixer and auger, and dispenser means, said reservoir releasing said prepared mixes into said freezing chamber as needed, said compressor, and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
   a. controller means responsive to said temperature sensor, and said dispenser means, and controlling said compressor, said mixer and auger;
   b. in said start-up and normal mode, said controller means:
      1. actuates said compressor, and said mixer and auger whenever said temperature sensor detects a temperature warmer than said temperature T2;
      2. turns off said compressor, and said mixer and auger whenever said temperature sensor detects a temperature equal to or cooler than said temperature T1;
      3. goes into said serve mode of operation whenever said dispenser means is actuated.
      4. goes into said standby mode of operation whenever said dispenser means has not been actuated for a preset period of time;
   c. in said serve mode of operation, said controller means:
      1. actuates said compressor, and said mixer and auger, whenever said dispenser means is actuated;
      2. disables said compressor when said temperature sensor detects a temperature T4 a selectable amount cooler than temperature T1, and enables said compressor when said temperature sensor detects a temperature wrmer than said T4;
      3. turns off said mixer and auger, and said compressor when said dispenser means is deactuated, and goes into said start-up and normal mode of operation;
d. in said standby mode of operation, said controller means cyclically:
1. actuates said compressor, and said mixer and auger whenever said temperature sensor detects a temperature warmer than said temperature T3;
2. disables said compressor whenever said temperature sensor detects a temperature cooler than said temperature T4;
3. goes into serve mode of operation whenever said dispenser means is actuated.

2. In an apparatus for manufacturing soft ice cream and the like from prepared liquid mixes, said apparatus having a reservoir, temperature senaor, freezing chamber, compressor, mixer and auger, and dispenser means, said reservoir releasing said prepared mixes into said freezing chamber as needed, said compressor, and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
a. controller means responsive to said temperature sensor, and said dispenser means, and controlling said compressor, said mixer and auger;
b. in said start-up and normal mode, said controller means cyclically:
1. actuates said compressor, and said mixer and auger whenever said temperature sensor detects a temperature warmer than said temperature T2;
2. turns off said compressor, and said mixer and auger whenever said temperature sensor detects a temperature equal to or cooler than said temperature T1;
3. goes into said serve mode of operation whenever said dispenser means is actuated; and
4. goes into said standby mode of operation whenever said dispenser means has not been actuated for a preset period of time.

3. In an apparatus for manufacturing soft ice cream and the like from prepared liquid mixes said apparatus having a reservoir, temperature sensor, freezing chamber, compressor, mixer and auger, and dispenser means, said reservoir relesing said prepared mixes into said freezing chamber as needed, said compressor, and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
a. controller means responsive to said temperature sensor, and said dispenser means, and controlling said compressor, said mixer and auger;
b. in said serve mode of operation, said controller means:
1. actuates said compressor, said mixer and auger whenever said dispenser means is activated;
2. disables said compressor when said temperature sensor detects a temperature T4 a selectable amount cooler than temperature T1, and enables said compressor when said temperature sensor detects a temperature warmer than said T4;
3. turns off said mixer and auger, and said compressor when said dispenser means is deactuated, and goes into said start-up and normal mode of operation.

4. In an apparatus for manufacturing soft ice cream and the like from prepared liquid mixes said apparatus having a reservoir, temperature sensor, freezing chamber, compressor, mixer and auger, and dispenser means, said reservoir releasing said prepared mixes into said freezing chamber as needed, said compressor, and said mixer and auger being actuated when said temperature sensor detects a temperature T2 or warmer in said soft ice cream, and being actuated when said temperature sensor detects a temperature T1 a preset amount cooler than said T2, said apparatus having a start-up and normal mode of operation, a serve mode of operation, and a standby mode of operation, the improvement comprising:
a. controller means responsive to said temperature sensor, and said dispenser means, and controlling said compressor, and said mixer and auger;
b. in said standby mode of operation, said controller means cyclically:
1. actuates said compressor, and said mixer and auger whenever said temperature sensor detects a temperature equal to or warmer a temperature T3, warmer than T1 be a selectable amount;
2. disables said compressor whenever said temperature sensor detects a temperature cooler than said temperature T4; and
3. goes into serve mode of operation whenever said dispenser means is actuated.

5. In an apparatus for manufacturing soft ice cream and the like from prepared liquid mixes, said apparatus having a reservoir, temperature sensor freezing chamber, compressor, mixer and auger, and dispenser means, said reservoir releasing said prepared mixes into said freezing chamber as needed, said compressor, and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, the improvement comprising:
a. controller means responsive to said temperature sensor, and said dispenser means, and controlling said compressor, and said mixer and auger;
b. in said start-up and normal mode, said controller means cyclically:
1. actuates said compressor, and said mixer and auger whenever said temperature sensor detects a temperature warmer than said temperature T2;
2. turns off said compressor, and said mixer and auger whenever said temperature sensor detects a temperature equal to or cooler than said temperature T1;
3. goes into said serve mode of operation whenever said dispenser means is actuated;
4. goes into said standby mode of operation whenever said dispenser means has not been actuated for a preset perod of the time;
c. in said serve mode of operation, said controller means:
1. actuates said compressor, and said mixer and auger whenever said dispenser means is actuated;

2. disables said compressor when said temperature sensor detects a temperature T4 a selectable amount cooler than temperature T1, and enables said compressor when said temperature sensor detects a temperature warmer than said T4; and
3. turns off said mixer and auger, and said compressor when said dispenser means is deactuated, and goes into said start-up and normal mode of operation.

6. In an apparaus for manufacturing soft ice cream and the like from prepared liquid mixes, said apparatus having a reservoir, temperature sensor, freezing chamber, compressor, mixer and auger, and dispenser means, said reservoir releasing said prepared mixes into said freezing chamber as needed, said compressor, and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
   a. controller means responsive to said temperature sensor, and said dispenser means, and controlling said compressor, said mixer and auger;
   b. in said start-up and normal mode, said controller means cyclically:
      1. actuates said compressor, and said mixer and auger whenever said temperature sensor detects a temperature warmer than said temperature T2;
      2. turns off said compressor, and said mixer and auger whenever said temperature sensor detects a temperature equal to or cooler than said temperature T1;
      3. goes into aid serve mode of operation whenever said dispenser means is actuated;
      4. goes into said standby mode of operation whenever said dispenser means has not been actuated for a preset period of time;
   c. in said standby mode of operation, said controller means cyclically:
      1. actuates said compressor, and said mixer and auger whenever said temperature sensor detects a temperature warmer than said temperature T3;
      2. disables said compressor whenever said temperature sensor detects a temperature cooler than temperature T4; and
      3. goes into serve mode of operation whenever said dispenser means is actuated.

7. In an apparatus for manufacturing soft ice cream and the like from prepared liquid mixes, said apparatus having a reservoir, temperature sensor, freezing chamber, compressor, mixer and auger, and dispenser means, said reservoir releasing said prepared mixes into said freezing chamber as needed, said compressor, and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
   a. controller means responsive to said temperature sensor, and said dispenser means, and controlling said compressor, and said mixer and auger;
   b. in said serve mode of operation, said controller means:
      1. actuates said compressor, and said mixer and auger whenever said dispenser means is
      2. disables said compressor when said temperature sensor detects a temperature T4 a selectable amount cooler than temperature T1, and enables said compressor when said temperature sensor detects a temperature warmer than said T4;
      3. turns off said mixer and auger, and said compressor when said dispenser means is deactuated, and goes into said start-up and normal mode of operation;
   c. in said standby mode of operation, said controller means cyclically:
      1. actuates said compressor, and said mixer and auger whenever said temperature sensor detects a temperature equal to or warmer a temperature T3, warmer than T1 be a selectable amount;
      2. disables said compressor whenever said temperature sensor detects a temperature cooler than said temperature T4;
      3. goes into serve mode of operation whenever said dispenser means is actuated.

8. In an apparatus for manufacturing soft ice cream and the like from prepared liquid mixes said apparatus having a reservoir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
   a. controller means responsive to said temperature sensor, and said dispenser means, and controlling said compressor, said mixer and auger, and said portion control means;
   b. in said start-up and normal mode, said controller means;
      1. disables said portion control means whenever said temperature sensor detects a temperature T3 warmer than said temperature T1 by a selectable amount;
      2. actuates said compressor, and said mixer and auger whenever said temperature sensor detects a temperature warmer than said temperature T2;
      3. enables said portion control means when said temperature sensor detects a temperature cooler than T3;
      4. turns off said compressor, and said mixer and auger whenever said temperature sensor detects a temperature equal to or cooler than said temperature T1;
      5. goes into said serve mode of operation whenever said dispenser means is actuated; and
      6. goes into said standby mode of operation whenever said dispenser means has not been actuated for a preset period of time;
   c. in said serve mode of operation, said controller means:
      1. actuates said compressor, said mixer and auger, and said portion control means said dispenser is actuated;

2. disables said compressor when said temperature sensor detects a temperature T4 a selectable amount cooler than temperature T1, and enables said compressor when said temperature sensor detects a temperature warmer than said T4;

3. turns off said mixer and auger, and said compressor when said portion control means terminates or said dispenser means is deactuated, and goes into said start-up and normal mode of operation;

d. in said standby mode of operation, said controller means cyclically:

1. disables said portion control means and actuates said compressor whenever said temperature sensor detects a temperature equal to or warmer than said temperature T3;
2. enables said portion control means when said temperature sensor detects a temperature cooler than said temperature T3;
3. disables said compressor whenever said temperature sensor detects a temperature cooler than said temperature T4; and
4. goes into said serve mode of operation whenever said dispenser means is activated.

9. In an apparatus for manufacturing soft ice cream and the like from prepared liquid mixes said apparatus having a reserovir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1a preset amount cooler than said T2, said apparatus having a start-up and normal mode of operation, a serve mode of operation, and a standby mode of operation, the improvement comprising:

a. controller means responsive to said temperature sensor, and said dispenser means, and controlling said compressor, said mixer and auger, and said portioon control means;

b. in said start-up and normal mode, said controller means:

1. disables said portion control means whenever said temperature sensor detects a temperature T3 warmer than said temperature T1 by a selectable amount;
2. actuates said compressor, and said mixer and auger whenever said temperature sensor detects a temperature warmer than said temperature T2;
3. enables said portion control means when said temperature sensor detects a temperature cooler than T3;
4. turns off said compressor, and said mixer and auger whenever said temperature sensor detects a temperature equal to or cooler than said temperature T1;
5. goes into said serve mode of operation whenever said dispenser means is actuated; and
6. goes into said standby mode of operation whenever said dispenser means has not been actuated for a preset period of time.

10. In an apparatus for manufacturing soft ice cream and the like from prepared liquid mixes said apparatus having a reservoir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:

a. controller means responsive to said temperature sensor, and said dispenser means, and controlling said compressor, said mixer and auger, and said portion control means;

in said serve mode of operation, said controller means:

1. actuates said compressor, said mixer and auger, and said portion control means said dispenser is actuated;
2. disables said compressor when said temperature sensor detects a temperature T4 a selectable amount cooler than temperature T1, and enables said compressor when said temperature sensor detects a temperature warmer than said T4;
3. turns off said mixer and auger, and said compressor when said portion control means terminates or said dispensor means is deactuated, and goes into said start-up and normal mode of operation.

11. In an apparatus for manufacturing soft ice cream and the like from prepared liquid mixes said apparatus having a reservoir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:

a. controller means responsive to said temperature sensor, and said dispensers means, and controlling said compressor, said mixer and auger, and said portion control means;

b. in said standby mode of operation, said controller means cyclically:

1. disables said portion control means and actuates said compressor whenever said temperature sensor detects a temperature equal to or warmer than said temperature T3;
2. enables said portion control means when said temperature sensor detects a temperature cooler than said temperature T3;
3. disables said compressor whenever said temperature sensor detects a temperature cooler than said temperature T4; and
4. goes into said serve mode of operation whenever said dispenser means is activated.

12. In an apparatus for manufacturing soft ice cream and the like from prepared liquid mixes said apparatus having a reservoir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1 a preset amount cooler sais than T2, said apparatus having a start-up and normal mode of operation, a serve mode of operation, and a standby mode of operation, the improvement comprising:
  a. controller means responsive to said temperature sensor, and said dispenser means, and controlling said compressor, said mixer and auger, and said portion control means;
  b. in said start-up and normal mode, said controller means:
    2. disables said portion control means whenever said temperature sensor detects a temperature T3 warmer than said temperature T1 by a selectable amount;
    2. actuates said compresssor, and said mixer and auger whenever said temperature sensor detects a temperature warmer than said temperature T2;
    3. enables said portion control means when said temperature sensor detects a temperature cooler than T3;
    4. turns off said compressor, and said mixer and auger whenever said temperature sensor detects a temperature equal to or cooler than said temperature T1;
    5. goes into said serve mode of operation whenever said dispenser means is actuated; and
    6. goes into said standby mode of operation whenever said dispenser means has not been actuated for a preset period of time;
  c. in said serve mode of operation, said controller means:
    1. actuates said compressor, said mixer and auger, and said portion control means said dispenser is actuated;
    2. disables said compressor when said temperature sensor detects a temperature T4 a selectable amount cooler than temperature T1, and enables said compressor when said temperature sensor detects a temperature warmer than said T4;
    3. turns off said mixer and auger, and said compressor when said portion control means terminates or said dispenser means is deactuated, and goes into said start-up and normal mode of operation.

13. In apparatus for manufacturing soft ice cream and the like from prepared liquid mixes said apparatus having a reservoir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising: .
  a. controller means responsive to said temperature sensor, and said dispenser means, and controlling said compressor, said mixer and auger, and said portion control means;
  b. in said start-up and normal mode, said controller means:
    1. disables said portion control means whenever said temperature sensor detects a temperature T3 warmer than said temperature T1 by a selectable amount;
    2. actuates said compressor, and said mixer and auger whenever said temperature sensor detects a temperature warmer than said temperature T1;
    3. enables said portion control means when said temperature sensor detects a temperature cooler than T3;
    4. turns off said compressor, and said mixer and auger whenever said temperature sensor detects a temperature equal to or cooler than said temperature T1;
    5. goes into said serve mode of operation whenever said dispenser means is actuated; and
    6. goes into said standby mode of operation whenever said dispenser means has not been actuated for a preset period of time;
  c. in said standby mode of operation, said controller means cyclically:
    1. disables said portion control means and actuates said compressor whenever said temperature sensor detects a temperature equal to or warmer than said temperature T3;
    2. enables said portion control means when said temperature sensor detects a temperature cooler than said temperature T3;
    3. disables said compressor whenever said temperature sensor detects a temperature cooler than said temperature T4; and
    4. goes into said serve mode of operation whenever said dispenser means is activated.

14. In an apparatus for manufacturing soft ice cream and the like from prepared liquid mixes said apparatus having a reservoir, temperature sensor freezing chamber, compressor, mixer and auger, dispenser means, and portion control means, said reservoir releasing said prepared mixes into said freezing chamber as needed, said compressor and said mixer and auger being actuated when said temperature sensor detects a temperature T2 or warmer in said soft ice cream, and being deactuated when said temperature sensor detects a temperature T1 a preset amount cooler than said T2, said apparatus having a start-up and normal mode of operation, a serve mode of operation, and a standby mode of operation, the improvement comprising:
  a. controller means responsive to said temperature sensor, and said dispenser means, and controlling said compressor, said mixer and auger, and said portion control means;
  b. in said serve mode of operation, said controller means:
    1. actuates said compressor, said mixer and auger, and said portion control means said dispenser is actuated;
    2. disables said compressor when said temperature sensor detects a temperature T4 a selectable amount cooler than temperature T1, and enables said compressor when said temperature sensor detects a temperature warmer than said T4;
    3. turns off said mixer and auger, and said compressor when said portion control means terminates or said dispenser means is deactuated, and goes into said start-up and normal mode of operation;
  c. in said standby mode of operation, said controller means cyclically:
    1. disables said portion contol means and actuates said compressor whenever said temperature sensor detects a temperature equal to or warmer than said temperature T3;

2. enables said portion control means when said temperature sensor detects a temperature cooler than said temperature T3;
3. disables said compressor whenever said temperature sensor detects a temperature cooler than said temperature T4; and
4. goes into said serve mode of operation whenever said dispenser means is activated.

15. The apparatus of claim 1, 6, 8, or 13 having a READY light and a NOT READY light, wherein said controller means, in said start-up and normal, and in said standby, modes of operation:
   a. turns off said READY light and turns on said NOT READY light when said temperature sensor detects a temperature equal to or warmer than said temperature T3; and
   b. turns on said READY light and turns off said NOT READY light when said temperature sensor detects a temperature cooler than said temperature T3.

16. The apparatus of claim 2, 5, 9, or 12 having a READY light and a NOT READY light, wherein said controller means, in said start-up and normal mode of operation:
   a. turns off said READY light and turns on said NOT READY light when said temperature sensor detects a temperature equal to or warmer than said temperature T3; and
   b. turns on said READY light and turns off said NOT READY light when said temperature sensor detects a temperature cooler than said temperature T3.

17. The apparatus of claim 4, 7, 11, or 14 having a READY light and a NOT READY light, wherein said controller means, in said standby mode of operation:
   a. turns off said READY light and turns on said NOT READY light when said temperature sensor detects a temperature equal to or warmer than said temperature T3; and
   b. turns on said READY light and turns off said NOT READY light when said temperature sensor detects a temperature cooler than said temperature T3.

* * * * *